United States Patent
Kümmerte et al.

(10) Patent No.: US 11,117,260 B2
(45) Date of Patent: Sep. 14, 2021

(54) METHOD FOR CONTROLLING A PLURALITY OF MOBILE DRIVERLESS MANIPULATOR SYSTEMS

(71) Applicant: KUKA Deutschland GmbH, Augsburg (DE)

(72) Inventors: Rainer Kümmerte, Munich (DE); Patrick Pfaff, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 167 days.

(21) Appl. No.: 16/086,810

(22) PCT Filed: Apr. 19, 2017

(86) PCT No.: PCT/EP2017/059285
§ 371 (c)(1),
(2) Date: Sep. 20, 2018

(87) PCT Pub. No.: WO2017/182520
PCT Pub. Date: Oct. 26, 2017

(65) Prior Publication Data
US 2019/0099884 A1    Apr. 4, 2019

(30) Foreign Application Priority Data
Apr. 21, 2016  (DE) .................... 10 2016 206 781.8

(51) Int. Cl.
*B25J 9/16* (2006.01)
*G05B 19/19* (2006.01)

(52) U.S. Cl.
CPC ........... *B25J 9/1664* (2013.01); *B25J 9/1697* (2013.01); *G05B 19/19* (2013.01);
(Continued)

(58) Field of Classification Search
CPC ....... B25J 9/1664; B25J 9/1697; G05B 19/19; G05B 2219/40298; G05B 2219/40424;
(Continued)

(56) References Cited

U.S. PATENT DOCUMENTS

| 6,374,155 B1 * | 4/2002 | Wallach | ............... G05D 1/0274 |
| | | | 700/245 |
| 9,056,754 B2 | 6/2015 | Wong et al. | |

(Continued)

FOREIGN PATENT DOCUMENTS

DE    102014002821 A1    8/2015

OTHER PUBLICATIONS

International Search Report dated Jul. 4, 2017 for PCT Patent Application No. PCT/EP2017/059285.

*Primary Examiner* — Jeff A Burke
*Assistant Examiner* — Jamal A Shah
(74) *Attorney, Agent, or Firm* — Bachman & LaPointe, P.C.

(57) ABSTRACT

The invention relates to a method for controlling a plurality of mobile driverless manipulator systems (10, 20), in particular driverless transport vehicles in a logistics environment (40) for manipulating objects (30). In the method, ambient information is provided by a central control device (50), and in one step, an object to be moved (30) in the surroundings is detected. The position and the pose of the detected object are used for updating the ambient information and are taken into account in the path planning of the mobile driverless manipulator systems (10, 20) in that, prior to a movement of the detected object (30), a first mobile driverless manipulator system (10) is used to check whether the detected object (30) is needed for the orientation of a second mobile driverless manipulator system (20).

20 Claims, 4 Drawing Sheets

(52) U.S. Cl.
CPC ............. *G05B 2219/40298* (2013.01); *G05B 2219/40424* (2013.01); *G05B 2219/40548* (2013.01); *G05B 2219/50393* (2013.01)

(58) Field of Classification Search
CPC .......... G05B 2219/40548; G05B 2219/50393; B66F 9/0755; G05D 2201/0216
See application file for complete search history.

(56) References Cited

U.S. PATENT DOCUMENTS

| | | | |
|---|---|---|---|
| 2005/0149256 A1 | 7/2005 | Lawitzky et al. | |
| 2010/0286824 A1* | 11/2010 | Solomon | F41H 13/00 700/248 |
| 2014/0074342 A1* | 3/2014 | Wong | B66F 9/0755 701/26 |
| 2018/0176735 A1 | 6/2018 | Schuller et al. | |

* cited by examiner

METHOD FOR CONTROLLING A PLURALITY OF MOBILE DRIVERLESS MANIPULATOR SYSTEMS

BACKGROUND

The present invention relates to a method for controlling a plurality of mobile driverless manipulator systems, in particular driverless transportation vehicles in a logistics environment for moving objects, and also a corresponding system for carrying out the method.

In modern production operations or logistics environments, mobile, driverless manipulator systems, in particular transportation systems, are frequently used to process objects, for example, such as material, workpieces, or products or transport them from one position to a next. The mobile manipulator systems can also have handling devices, for example, manipulators or industrial robots, to be able to move them substantially freely in an environment. A driverless mobile manipulator system can comprise, for example, a robot vehicle, which is movable multidirectionally and in particular omnidirectionally. The systems typically have independent drives and are automatically controlled. A vehicle-internal control unit can be used for this purpose, for example, which activates corresponding drives of the driverless system to cause a desired movement of the system. The control unit can be based on a program which specifies the movement of the system, for example, direction and velocity.

To enable safe operation of such a manipulator system, they are often equipped with sensors, such as laser scanners, using which, on the one hand, a so-called protective field (frequently also called safety area or safety region) can be monitored and/or using which the mobile system can orient itself on the basis of features in the environment. The sensors are used in some sense as the "eyes" of the mobile system. One of the capabilities of a mobile manipulator system is to be able to orient itself in an environment, i.e., to know how its environment appears and where it is located therein. If, for example, environmental information in the form of a map of the environment is provided, mobile manipulator systems can localize themselves in the environment with the aid of their sensors on the basis of orientation points and determine their position in the map and therefore accurate and autonomous movement of the systems in the environment is possible.

An array of different methods, which can be used individually or in combination, are known for controlling such mobile systems. For example, mobile manipulator systems frequently use a SLAM method (simultaneous localization and mapping), in order to learn a map of the environment by means of sensors. In autonomous operation, the present sensor data are integrated with this learned map together with, for example, odometry measurements, to enable a safe and reliable movement of the system in the environment.

A method for controlling autonomous industrial vehicles is previously known from U.S. Pat. No. 9,056,754 B2, in which dynamically placed objects are used as orientation points. According to this document, for example, objects, such as products to be handled in a logistics environment (such as a warehouse), are placed at a determined point within an environment and subsequently the position and pose of this object is determined, in that the position data (such as data on position and pose in particular) of the vehicle which has placed the object are used. Subsequently, the pose of the object thus determined or estimated is used to update an existing map of the environment. The placed object is taken into consideration in the control of the vehicle, and can be used, for example, as an orientation point ("landmark") for orienting the vehicle within the environment.

During the use of mobile manipulator systems, the environment is generally not static, but rather continuously changes, for example, by the objects to be handled by the mobile manipulator systems being moved. In the case of a cooperation of a plurality of mobile manipulator systems (i.e., two or more manipulator systems), it can therefore occur that one of the systems moves around already placed objects, which are required by other manipulator systems for orientation.

The present invention is based on the object of providing a method for controlling a plurality of mobile driverless manipulator systems, which avoids the disadvantages of the prior art as much as possible and in particular enables efficient operation of the plurality of manipulator systems.

These and further objects which will become apparent from the following description are achieved by a method as claimed and a system for carrying out the method as claimed.

SUMMARY

The present invention relates to a method for controlling a plurality (i.e., two or more) of mobile driverless manipulator systems, such as driverless transportation vehicles in particular, as can be used, for example, in a logistics environment in a warehouse or in a production operation for moving objects. The manipulator systems comprise sensors for orientation and have communication means to communicate with at least one central control unit. The method comprises the following steps in this case: providing environmental information by way of the at least one central control unit, detecting an object to be manipulated by the mobile driverless manipulator systems in the environment and determining position and pose of the detected object, updating the environmental information using the position and preferably also the pose of the detected object, and then taking into consideration the position and preferably also the pose of the detected object in the path plan of the mobile driverless manipulator systems, by checking before a manipulation of a detected object by a first mobile driverless manipulator system whether the detected object is required for the orientation of a second driverless manipulator system. The designations "first" and "second" manipulator system are used here only for the unambiguous definition of the systems and do not represent a numeric restriction of the systems.

The central control unit can consist, for example, of one or more computers, associated communication means, command input devices, etc. and can provide environmental information, for example, in the form of a map in particular, to the mobile driverless manipulator systems (also abbreviated hereafter as manipulator systems or systems). The detection of an object to be manipulated in the environment and the determination of position and pose of the detected object can be carried out, for example, by the manipulator systems themselves, in particular with the aid of the sensors of these systems. However, it is also conceivable only to collect items of information about the environment by means of the sensors and transmit these data to the central control unit, wherein the actual detection and the determination of position and pose are then carried out in the control unit. The objects to be manipulated can be, for example, workpieces or products or the like and a manipulation of the object is understood, for example, as the processing of the object, but in particular a change of the position and/or the pose, i.e., a movement of the object.

During the updating of the environmental information using the position and pose of the detected object, for example, a map of the environment in the central control unit can be updated. The detected object can be entered in the map, for example, as an obstruction, which has to be taken into consideration in the path plan of the manipulator systems. It is advantageous in this case if not only the position of the object, but rather also the pose of the object is taken into consideration, since a particularly efficient path plan is possible in this manner, since manipulator systems can then be moved very closely around the objects. However, it is also conceivable that, for example, position and type of the detected object are stored during the updating of the environmental information. The manipulator systems can then themselves determine the pose of the object in the environment on the basis of this information. The pose is thus taken into consideration indirectly during the updating of the environmental information in this case.

In the path plan of the mobile driverless manipulator systems, position and pose of the detected object are taken into consideration by checking before a manipulation of the detected object (for example, a change of the position or pose of the object) by a first manipulator system whether the detected object is required for the orientation of a second manipulator system. In the path plan, not only the presence of the detected objects, so that the systems do not collide with them, for example, are thus taken into consideration but rather also that the objects are partially required for the orientation of the mobile systems. The detected objects are thus used as orientation points in the environment. Therefore, for example, an object cannot be readily moved by a first manipulator system if a second system, which already follows a path plan, still requires this object for orientation. In the path plan of the manipulator systems, it is thus taken into consideration, for example, whether the path plan of a first system, in which, for example, the movement of a detected object is provided, impairs the path plan or movement of another, second system.

The detection of the objects to be manipulated or moved can be carried out in particular by means of sensors, which are provided either on the manipulator systems themselves, or stationary attached sensors can also be used, which monitor, for example, a determined region of the environment.

The sensors of the manipulator systems are preferably optical sensors, in particular laser scanners or also stereo cameras, which all preferably permit distance measurements to be carried out. Distance measurements are typically carried out by means of optical sensors in order to acquire and/or recognize objects in the space.

Preferably, the detection of the object to be manipulated and/or moved and also of the position and pose of the object is carried out with the aid of the optical sensors of the manipulator systems. This can be carried out, for example, by a manipulator system positioning (depositing) an object to be moved at a determined position and communicating the corresponding items of information about position and pose of the deposited object to the central control unit. The other provided manipulator systems thus have access to these items of information by way of the central control unit and can take into consideration the known position and pose of the deposited object. The detection and/or recognition of the object and of the pose of the object can be based in particular on a comparison of the acquired sensor data to models of objects to be recognized. Methods for sensor-based recognition of three-dimensional objects are known in principle to a person skilled in the art, and therefore a further explanation can be omitted here. Reference is made solely by way of example to US 2015/0015602 A1, the content of which is incorporated in its entirety by reference.

The comparison of the acquired sensor data to models of objects to be recognized preferably takes place in a decentralized manner in corresponding data processing devices of the manipulator systems. The detection and/or determination of an object and the detection of the pose of the object thus do not take place, for example, in the central control unit, but rather locally in the individual manipulator systems, as soon as their sensors suitably acquire an object to be moved. This has the advantage that the object recognition can be carried out very rapidly, since no data transfer is required between the central control unit and the manipulator systems. The object recognition is a task running in the background, which does not influence the present tasks of the manipulator system. The objects to be recognized are typically known and the manipulator systems have, for example, suitable items of information (models), such as the outline of the object, to compare it to the data of the sensors. Learning of corresponding models by the manipulator systems is also possible. Individual manipulator systems can also intentionally search for objects by way of the communication means and thus improve their own position estimations in the sense of distributed intelligence.

The manipulator systems preferably detect the object to be manipulated with the aid of their sensors and transmit a message, which is representative of the position and pose of the object, by means of the communication means to the central control unit to update the environmental information. The message can contain the pose and the uncertainty of the pose estimation or also merely raw data of the sensors, however, and therefore position and/or pose of the object are then determined by the central control unit. By the environmental information being updated, these items of information about position, pose, and also type of the object can also be provided to the other manipulator systems.

The transmission of the message is preferably carried out using timestamps in order to acquire the precise point in time of the detection. The messages provided with timestamps are thus, for example, transferred from the individual manipulator systems into a database of the central control unit. The timestamp of the message is used, inter alia, to recognize delayed messages. For example, the central sequence controller can thus correctly store the last state of an object and communicate it, for example, to the manipulator systems.

The method preferably furthermore comprises the steps of using the updated environmental information by way of a manipulator system to estimate the position of the detected object in relation to the manipulator system and to detect this object again by means of the sensors of the manipulator system. This can be advantageous, for example, if a manipulator system travels along a predefined path and is to orient itself on the basis of the already detected objects; it therefore uses the detected objects as orientation points. As it travels along the path, the manipulator system can estimate on the basis of the updated items of environmental information when the sensors of the manipulator system are supposed to acquire the detected object. If the sensors acquire the object at the expected position and in the expected pose, this information can be used to enhance the accuracy of the localizing of the manipulator system.

The method preferably furthermore comprises the following steps: using the updated environmental information by way of a manipulator system to estimate the position of the object relative to the manipulator system and intentionally searching for this object by way of this manipulator system to improve the position estimation of this manipulator system. If it is desired, for example, that the position estimation of a determined manipulator system be improved, this system can intentionally modulate the detected object located closest on the basis of the updated environmental information, such as an updated map of the environment. If the sensors of the manipulator system find the modulated object at the expected point, this information can in turn be used to improve the position estimation and/or the localizing of the manipulator system.

The method furthermore preferably comprises the steps of detecting the already detected object again by means of the sensors of a manipulator system and using the sensor data to improve the accuracy of the determination of position and pose of this object. If a manipulator system travels past an already detected object, for example, and the sensors of the manipulator system acquire the object, the position and pose of the object can be determined therefrom again (i.e., a second estimation of position and pose can be produced) and the results of this second detection can be used to improve the accuracy. These more accurate items of information can then in turn be taken into consideration during the updating of the environmental information to produce more accurate items of environmental information, such as a more accurate map of the environment. The more accurate items of information can advantageously be used for the purpose of planning movements again if the pose of the objects is changed or adapting the path.

The method preferably furthermore comprises the following step: if the detected object is required for the orientation of a second driverless manipulator system, deciding whether the path plan for the second driverless manipulator system will be modified. There are various reaction strategies if it is established that a detected object which is to be moved, for example, by the first mobile driverless manipulator system is required for a successful movement of a second manipulator system. It is conceivable, for example, that the movement of the object by the first manipulator system has priority, and the path plan for the second system therefore has to be modified. The second manipulator system is then guided, for example, along a path in which the object to be moved is not required for orientation, since the second system can orient itself at other orientation points in this path.

The method preferably furthermore comprises the following step: if the detected object is required for the orientation of a second driverless manipulator system, determining the time which the object has to remain at its position until the second manipulator system has completed its orientation on the basis of the object. It is thus taken into consideration in the path plan of the various manipulator systems, for example, whether manipulator systems require determined detected objects for orientation as they travel along their respective path. If this is the case, for example, the expected time which the object has to remain in its pose is determined to ensure that the corresponding manipulator system is capable of detecting the object. The orders for a determined object are preferably managed accordingly in a queue for this purpose, in order to model the dependence of other orders on the present pose of the object. The orders are preferably provided with priorities for this purpose, in order to compute adaptations of the existing plans of other affected manipulator systems accordingly in the event of an important (urgent) order for, for example, the transportation or the movement of an object. A balancing thus takes place between the longer travels which arise for instance due to detours and the expected waiting time due to the delayed transportation, on the other hand. If the movement of a determined detected object has a high priority, for example, but the presence of this object is required for the orientation of a second manipulator system in a determined path plan, the path plan for this second system is thus modified, for example, so that the movement of the object can take place as rapidly as possible. The mobile driverless manipulator systems themselves can also be considered to be objects in the scope of this invention and can be used to improve the localizing and planning of (other) mobile driverless manipulator systems.

The invention also relates to a system for handling objects to be moved, preferably in a logistics environment, comprising a plurality of mobile driverless manipulator systems for handling the objects, such as driverless transportation vehicles in particular, and also at least one central control unit. The manipulator systems comprise sensors for orientation and have communication means to communicate with the central control unit. The control unit and the mobile manipulator systems are configured in this case to carry out a method as described herein.

BRIEF DESCRIPTION OF THE DRAWINGS

The present invention will be described hereafter with reference to the appended figures. In the figures.

DETAILED DESCRIPTION

Figure 1:
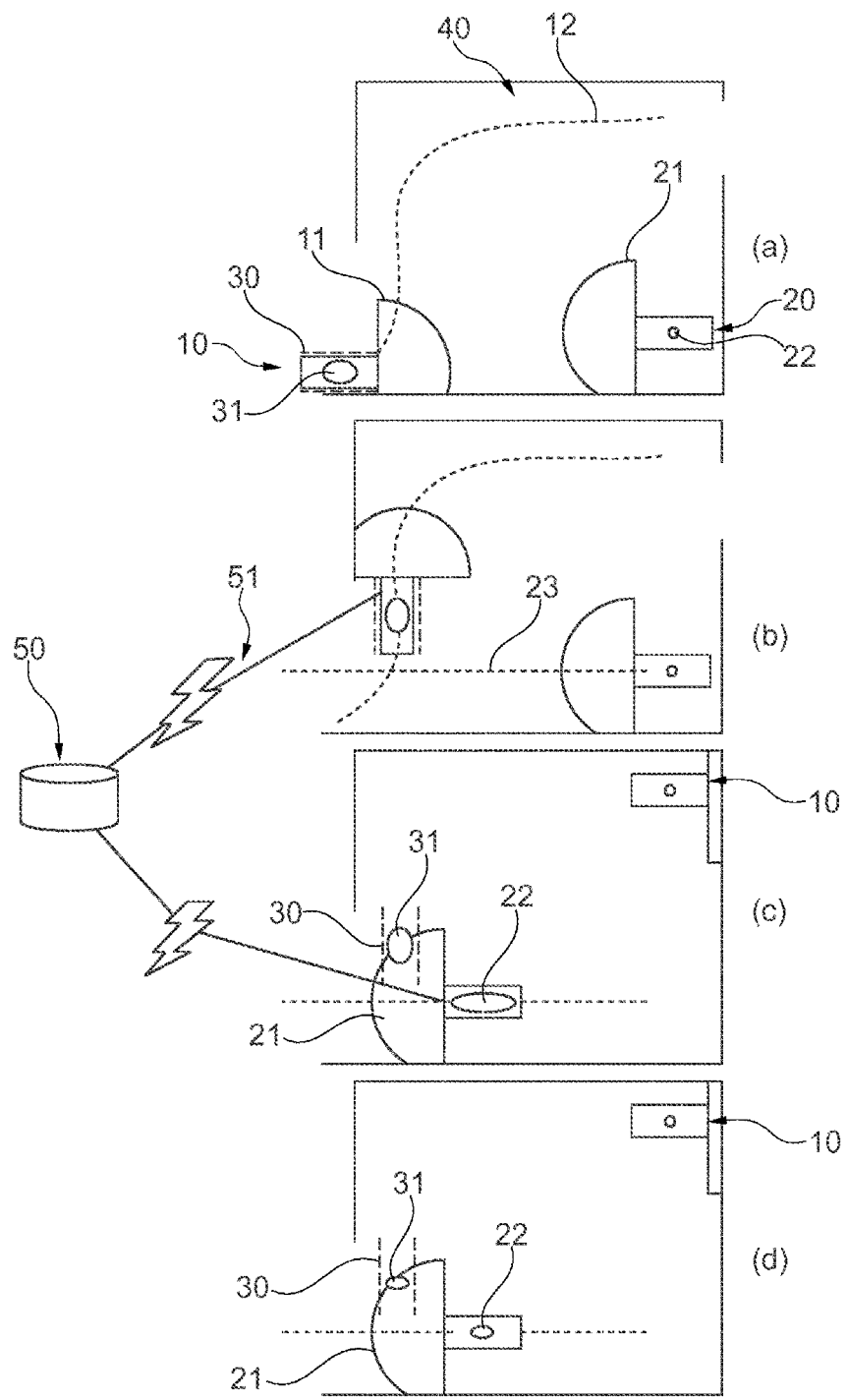
FIG. 1 schematically shows localizing of a mobile manipulator system with the aid of a detected object.

FIG. 1 schematically shows an example of cooperative localizing with the aid of a detected object. Two mobile driverless manipulator systems, namely driverless transportation vehicles 10 and 20, are provided in an environment 40 in the example. The two manipulator systems 10, 20 have optical sensors (not shown), specifically laser scanners in particular, which have a semicircular scanning region in the travel direction of the manipulator systems. The visual range of the sensors and the scanning region are indicated with the reference signs 11 and 21, respectively (see FIG. 1a). The first manipulator system 10 transports an object 30 to be moved and follows a path plan 12. In FIG. 1b, the manipulator system 10 has moved somewhat along its path plan 12 and deposits the object 30 at the indicated point. The deposited object 30 can be detected by stationary sensors (not shown) being used, for example, or the position and pose of the object 30 being estimated on the basis of the position information of the manipulator system 10 upon depositing the object 30 in the position in FIG. 1b, for example. Corresponding items of information are transferred to a central control unit 50, which communicates wirelessly with the manipulator systems, for example, as indicated by the line 51. The updated items of environmental information having the estimated position and pose of the detected object 30 can now be used in the path plan of the second manipulator system 20. The path plan is indicated by the dashed line having the reference sign 23. The position and pose of the object 30 are only estimated and are relatively inaccurate at the time of FIG. 1b. This is indicated by the ellipse 31, which is relatively large in FIGS. 1a and 1b.

In FIG. 1c, the second manipulator system 20 has moved somewhat along its path 23. As a result of this movement, the localizing of the manipulator system 20 is less accurate than at the beginning of the movement, which is to be indicated by the uncertainty ellipse 22 (see FIG. 1c) enlarged in comparison to FIG. 1b. In the situation shown in FIG. 1c, the sensors of the manipulator system 20 acquire the object 30 at a position at which the object 30 would be approximately expected on the basis of the updated environmental information. This renewed detection of the object 30 can be used in this case, on the one hand, to determine position and pose of the object 30 more accurately. On the other hand, however, it can also be used to improve the position estimation of the manipulator system 20. This is indicated in FIG. 1d by the two uncertainty ellipses 31 and 22, which are accordingly reduced in size.

Figure 2:
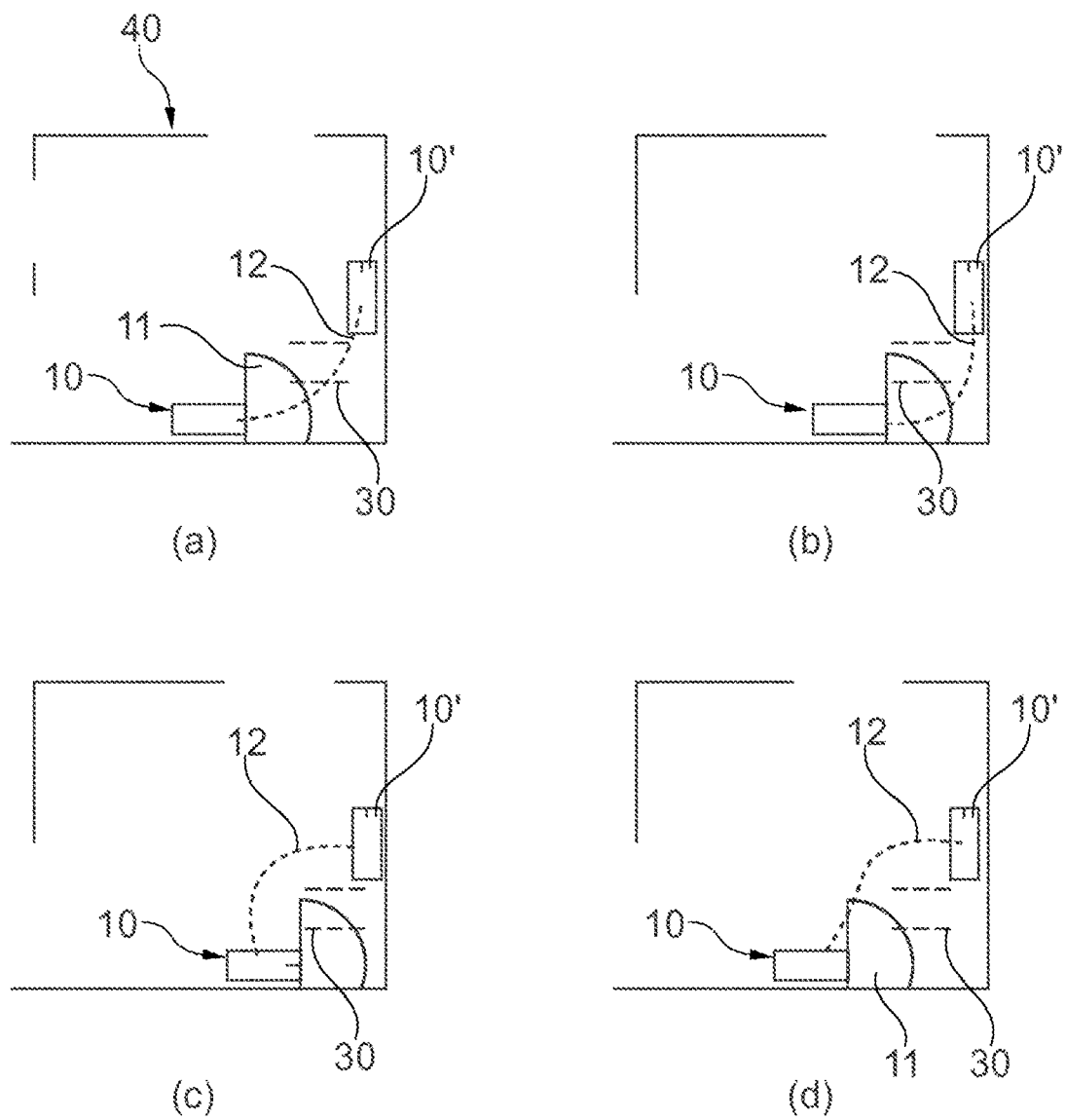
FIG. 2 schematically shows various path plans with and without object recognition.

A total of four schematic illustrations 2a to 2d of possible path plans for a manipulator system are shown in FIG. 2. In this case, the illustrations a, b, c correspond to a path plan without detection of the object 30 and FIG. d corresponds to a corresponding path plan with detection of the object 30. A manipulator system 10 is schematically shown in FIG. 2a, having corresponding sensors, which have a visual range 11. The planned destination of the manipulator system 10 is indicated by 10'. An object 30 to be moved is again designated by the reference sign 30, which could not be used up to this point in the path plan 12 of the manipulator system 10, however, since it has not yet been detected. The path plan 12 of the manipulator system thus presumes in the situation of FIG. 2a that the object 30 is not present. In the situation of FIG. 2a, however, the sensors acquire a part of the object 30, and therefore the path plan 12 has to be dynamically adapted. As shown in FIG. 2b, the manipulator system travels farther and dynamically adapts its path, since the sensors still detect blocking of the route by the object 30. In the situation of FIG. 2c, the manipulator system 10 establishes that it has to travel back again and has to take an entirely different route to reach the destination 10', in order to bypass the object 30. Such detours can be avoided in the case of a path plan with knowledge of position and orientation of the object 30.

In the situation of FIG. 2d, the object 30 was detected and taken into consideration during the updating of the environmental information by the central control unit 50. As can be seen in FIG. 2d, the path plan 12 can now take into consideration the presence of the object 30 from the outset, and therefore the manipulator system 10 can travel into the destination 10' without detours.

Figure 3:
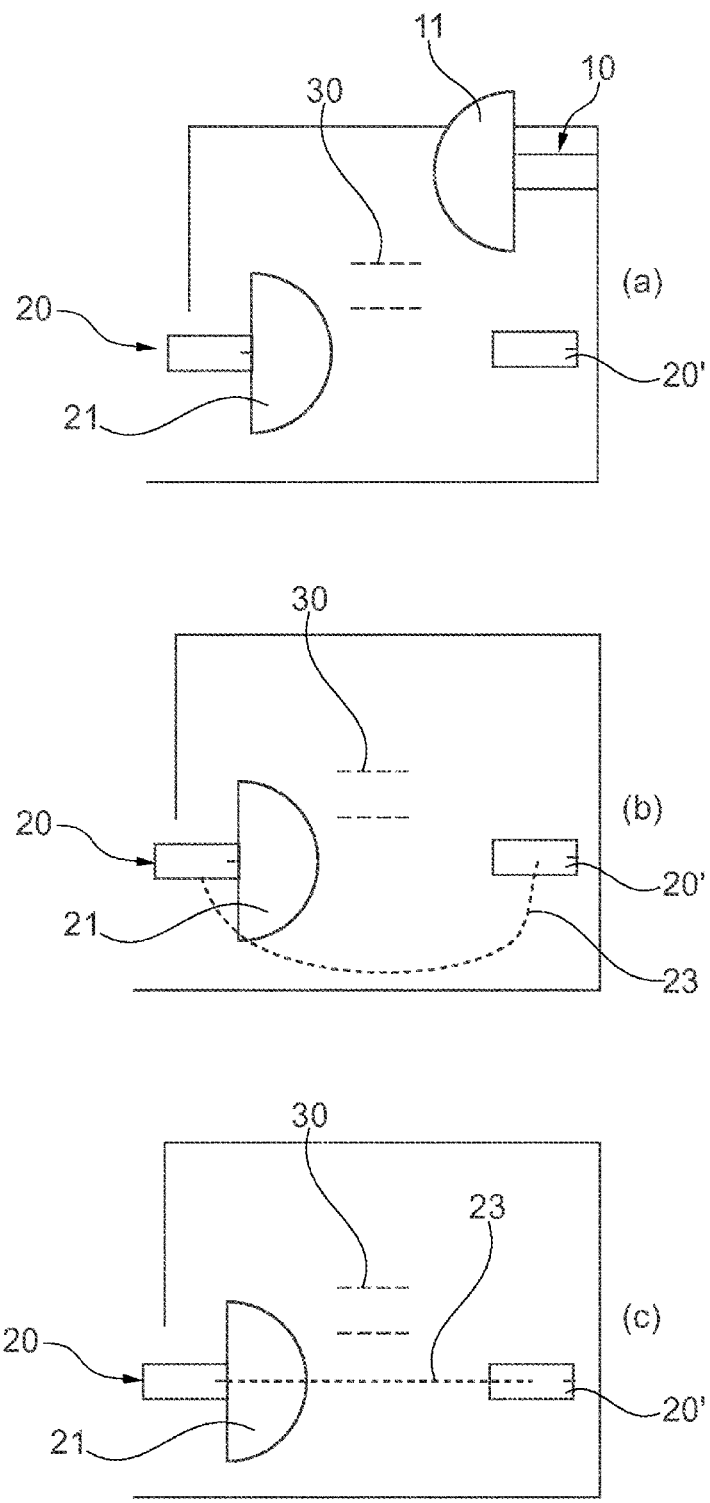
FIG. 3 schematically shows path plans utilizing the knowledge of position and pose of detected objects.

In FIG. 3, a first manipulator system 10 is to transport an object 30 to be moved to another location. A second manipulator system 20 is to be moved to its destination 20'. For the path plan of the second manipulator system 20, the object 30 can be used as an orientation point and therefore, as indicated in FIG. 3c, the manipulator system 20 can be guided on a direct route to its destination 20'. Without the consideration of the detected object 30 in the path plan, the manipulator system 20 would have to take the bypass as indicated in FIG. 3b, since in this example otherwise no features are present for accurate localizing of the manipulator system 20 and the manipulator system 20 therefore cannot travel the direct route in this example without the orientation point of the detected object 30. Before the detected object 30 is moved by the first manipulator 10, it is therefore checked whether the detected object 30 is required for the orientation of the second mobile manipulator system 20. Since this is the case here, the movement of the object 30 by the first manipulator system 10 is deferred until the second manipulator system 20 has completed its orientation on the basis of the object 30. It is clear in this case that the second manipulator system 20 does not necessarily have to be moved up into its destination 20' for this purpose, but rather it is sufficient if the sensors of the manipulator system 20 acquire the object 30 and thus enable accurate localizing of the manipulator system 20.

Figure 4:
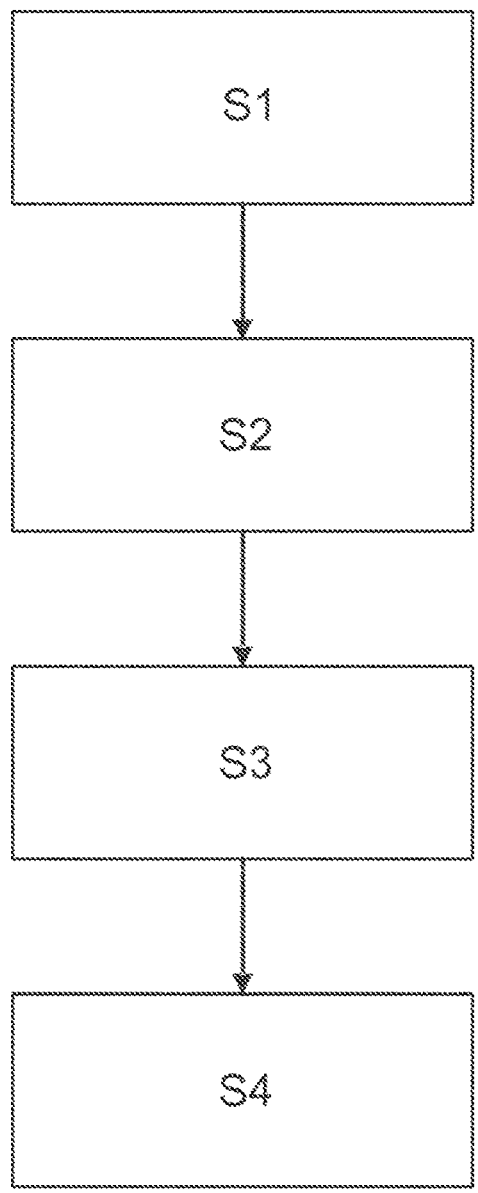
FIG. 4 shows a schematic flow chart of an exemplary method.

FIG. 4 schematically shows a flow chart of the method according to the invention. In step S1, items of environmental information are provided by a central control unit, for example, a map of the environment, in which the mobile manipulator systems are to move. In step S2, an object to be moved is detected in the environment and the position and pose of the detected object are determined. These items of information are used in step S3 to update the environmental information with the position and pose of the detected object. In step S4, the position and pose of the detected object are then taken into consideration in the path plan of the mobile manipulator systems, in which it is checked before a movement of the detected object by a first mobile manipulator system whether the detected object is required for the orientation of a second manipulator system.

LIST OF REFERENCE SIGNS 10, 20 mobile driverless manipulator systems
11, 21 visual range of the sensors
30 object
22, 31 uncertainty ellipse
12, 23 path plan
40 environment
50 central control unit
51 line (wireless communication link)
10', 20' destination of the manipulator system

The invention claimed is:

1. A method for controlling a plurality of mobile driverless manipulator systems (10, 20) in a logistics environment (40) for moving objects (30), wherein the mobile driverless manipulator systems (10, 20) each comprise a sensor for orientation and have a wireless communication link in order to communicate with at least one central control unit (50), which method comprises the following steps:
   providing environmental information by way of the at least one central control unit (50);
   detecting an object (30) to be manipulated by the mobile driverless manipulator systems (10, 20) in the environment and determining position and pose of the detected object (30);
   updating the environmental information with the position and pose of the detected object (30);
   taking into consideration the position and pose of the detected object (30) in a path plan of one or more of the mobile driverless manipulator systems (10, 20), by checking before a manipulation of the detected object (30) by a first mobile driverless manipulator system (10) whether the detected object (30) is required for orientation of a second mobile driverless manipulator system (20).

2. The method for controlling a plurality of mobile driverless manipulator systems (10, 20) as claimed in claim 1, wherein the sensors are optical sensors.

3. The method for controlling a plurality of mobile driverless manipulator systems (10, 20) as claimed in claim 2, wherein the detection of position and pose of the detected object (30) is carried out with the aid of the optical sensors of the mobile driverless manipulator systems (10, 20).

4. The method for controlling a plurality of mobile driverless manipulator systems (10, 20) as claimed in claim 3, wherein the comparison of acquired sensor data to models of objects to be recognized takes place in a decentralized manner in data processing devices of the mobile driverless manipulator systems (10, 20).

5. The method for controlling a plurality of mobile driverless manipulator systems (10, 20) as claimed in claim 2, wherein at least one of the mobile driverless manipulator systems (10, 20) detect the detected object (30) with their sensors and transmit a message representative of position and pose of the detected object (30) by the wireless communication link to the central control unit (50) to update the environmental information.

6. The method for controlling a plurality of mobile driverless manipulator systems (10, 20) as claimed in claim 5 wherein the transmission of the message is carried out using timestamps in order to acquire a precise point in time of the detection.

7. The method for controlling a plurality of mobile driverless manipulator systems (10, 20) as claimed in claim 5 wherein the message contains the pose and an uncertainty of pose estimation for the detected object (30).

8. The method for controlling a plurality of mobile driverless manipulator systems (10, 20) as claimed in claim 7 wherein the transmission of the message is carried out using timestamps in order to acquire a precise point in time of the detection.

9. The method for controlling a plurality of mobile driverless manipulator systems (10, 20) as claimed in claim 8 wherein the message contains the pose and an uncertainty of pose estimation for the detected object (30).

10. The method for controlling a plurality of mobile driverless manipulator systems (10, 20) as claimed in claim 2, wherein the optical sensors are laser scanners.

11. The method for controlling a plurality of mobile driverless manipulator systems (10, 20) as claimed in claim 2, wherein the detection of position and pose of the detected object (30) is carried out with the aid of the optical sensors of the mobile driverless manipulator systems (10, 20), and is based on a comparison of acquired sensor data from the detection of position and pose of the detected object to models of objects to be recognized.

12. The method for controlling a plurality of mobile driverless manipulator systems as claimed in claim 1, furthermore comprising the following steps:
using the updated environmental information to estimate position of the detected object (30) in relation to the second mobile driverless manipulator system (10, 20) and redetecting the detected object by the sensor of the second mobile driverless manipulator system.

13. The method for controlling a plurality of mobile driverless manipulator systems (10, 20) as claimed in claim 1, furthermore comprising the following steps:
using the updated environmental information to estimate position of the object (30) in relation to the second mobile driverless manipulator system and intentionally searching for the detected object (30) by the second mobile driverless manipulator system to improve position estimation of the second mobile driverless manipulator system.

14. The method for controlling a plurality of mobile driverless manipulator systems (10, 20) as claimed in claim 1, furthermore comprising the following steps:
redetecting the detected object (30) by the sensors of a said mobile driverless manipulator system (10, 20) and using sensor data from said redetecting to improve an accuracy of determination of the position and pose of the detected object.

15. The method for controlling a plurality of mobile driverless manipulator systems (10, 20) as claimed in claim 1, furthermore comprising the following step:
responsive to determining that the detected object (30) is required for the orientation of the second mobile driverless manipulator system (20), deciding whether the path plan will be modified for the second mobile driverless manipulator system (20).

16. The method for controlling a plurality of mobile driverless manipulator systems (10, 20) as claimed in claim 1, furthermore comprising the following step:
responsive to determining that the detected object (30) is required for the orientation of the second mobile driverless manipulator system (20), determining a time which the detected object has to remain at its position until the second mobile driverless manipulator system has completed its orientation based on the detected object.

17. The method for controlling a plurality of mobile driverless manipulator systems (10, 20) as claimed in claim 1, furthermore comprising the following step:
managing orders of the detected object (30) in the central control unit (50) in a queue, to model dependence of other orders on a present pose of the detected object.

18. The method for controlling a plurality of mobile driverless manipulator systems (10, 20) as claimed in claim 17, furthermore comprising the following step:
prioritizing the orders and responsive to determining that the detected object (30) is required for the orientation of a second driverless manipulator system (20), deciding whether the path plan for the second mobile driverless manipulator system (20) will be modified depending on the priority of the orders.

19. The method for controlling a plurality of mobile driverless manipulator systems (10, 20) as claimed in claim 1, wherein at least one of the mobile driverless manipulator systems (10, 20) detect the detected object (30) with their sensors and transmit a message representative of position and pose of the detected object (30) by the wireless communication link to the central control unit (50) to update the environmental information.

20. A system for handling objects (30) to be moved in a logistics environment, comprising a plurality of mobile driverless manipulator systems (10, 20) for handling the objects and at least one central control unit (50), wherein the mobile driverless manipulator systems (10, 20) each comprise a sensor for orientation and have a wireless communication link in order to communicate with a central control unit (50), wherein the control unit (40) and the plurality of mobile driverless manipulator systems (10, 20) are configured to carry out a method as claimed in claim 1.

* * * * *